United States Patent
Iyer et al.

(10) Patent No.: US 11,422,963 B2
(45) Date of Patent: Aug. 23, 2022

(54) SYSTEM AND METHOD TO HANDLE UNCOMPRESSIBLE DATA WITH A COMPRESSION ACCELERATOR

(71) Applicant: DELL PRODUCTS, LP, Round Rock, TX (US)

(72) Inventors: Shyamkumar Iyer, Cedar Park, TX (US); Andrew Butcher, Cedar Park, TX (US); Glen Sescila, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 7 days.

(21) Appl. No.: 17/071,545

(22) Filed: Oct. 15, 2020

(65) Prior Publication Data

US 2022/0121590 A1 Apr. 21, 2022

(51) Int. Cl.
*G06F 13/38* (2006.01)
*G06F 9/455* (2018.01)
*G06F 13/28* (2006.01)

(52) U.S. Cl.
CPC .......... *G06F 13/38* (2013.01); *G06F 9/45558* (2013.01); *G06F 13/28* (2013.01); *G06F 2213/28* (2013.01)

(58) Field of Classification Search
CPC ...... G06F 13/28; G06F 13/38; G06F 9/45558; G06F 2213/28; G06F 2212/401; G06F 3/0608; H03M 7/30; G11B 20/00007
USPC .......................................................... 710/68
See application file for complete search history.

(56) References Cited

U.S. PATENT DOCUMENTS

| | | | | |
|---|---|---|---|---|
| 7,030,887 B2* | 4/2006 | Andrews | ............... | G06T 15/005 345/422 |
| 9,407,789 B2* | 8/2016 | Puigardeu Aramendia | ................. | G06K 15/10 |
| 9,600,317 B2* | 3/2017 | Guo | ..................... | G06F 9/45558 |
| 9,626,249 B1* | 4/2017 | Bushman | ................ | H03M 7/30 |
| 11,119,668 B1* | 9/2021 | Keller | ................... | G06F 3/0619 |
| 11,281,602 B1* | 3/2022 | Iyer | ...................... | G06F 13/1668 |

(Continued)

OTHER PUBLICATIONS

"Introducing Smart Data Acceleration Interface (SDXI)"—Storage Developer Conference, Sep. 22-23, 2020; Shayam Iyer and Richard A. Brunner; 32 pages (Year: 2020).*

(Continued)

*Primary Examiner* — Brian T Misiura
(74) *Attorney, Agent, or Firm* — Larson Newman, LLP

(57) ABSTRACT

An information handling system includes a compression client, a memory, and a SDXI hardware module. The compression client issues a compression request for a block of data that is uncompressed. The memory has multiple storage locations identified by addresses, which include a source address and a destination address. The SDXI hardware module performs compression of the block of data to create compressed data of the block of data. The SDXI hardware module determines whether an amount of the compression of the block of data is less than a threshold amount of compression. In response to the amount of the compression being less than the threshold amount of compression, the SDXI hardware module disregards the compressed data of the block of data, and utilizes the uncompressed block of data in a source address. The SDXI hardware module updates metadata for the block of data to indicate that data returned to compression client is uncompressed.

17 Claims, 10 Drawing Sheets

(56) References Cited

U.S. PATENT DOCUMENTS

| | | |
|---|---|---|
| 2012/0239849 A1 | 9/2012 | Brahmaroutu et al. |
| 2019/0132283 A1 | 5/2019 | Ballard et al. |
| 2020/0133583 A1* | 4/2020 | Xiao .................. H03M 7/3071 |
| 2021/0223981 A1* | 7/2021 | Hsiao .................... G06F 3/0673 |
| 2021/0286726 A1* | 9/2021 | Kucherov ........... G06F 12/0871 |

OTHER PUBLICATIONS

"Introducing Smart Data Acceleration Interface (SCXI)"—In-Memory Computing Summit Virtual Event, Oct. 28, 2020; Shyamkumar Iyer; 27 pages (Year: 2020).*

* cited by examiner

SYSTEM AND METHOD TO HANDLE UNCOMPRESSIBLE DATA WITH A COMPRESSION ACCELERATOR

FIELD OF THE DISCLOSURE

This disclosure generally relates to information handling systems, and more particularly relates to handling uncompressible data with a compression accelerator.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a compression client, a memory, a Smart Data Accelerator Interface (SDXI) hardware module, and a driver. The compression client may issue a compression request for a block of data that is uncompressed. The memory has multiple storage locations identified by addresses, which include a source address and a destination address. The source and destination addresses may be in same or different address spaces. The SDXI hardware module may perform compression of the block of data to create compressed data of the block of data. The SDXI hardware module may determine whether an amount of the compression of the block of data is less than a threshold amount of compression. In response to the amount of the compression being less than the threshold amount of compression, the SDXI hardware module may disregard the compressed data of the block of data, and utilizes the uncompressed block of data in a source address. The SDXI hardware module may update metadata for the block of data to indicate that data returned to compression client is uncompressed. The driver can swap source address into destination address if source and destination addresses are in same address spaces, or SDXI hardware module can copy uncompressed data from source address to the destination address if source and destination addresses are in different address spaces.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
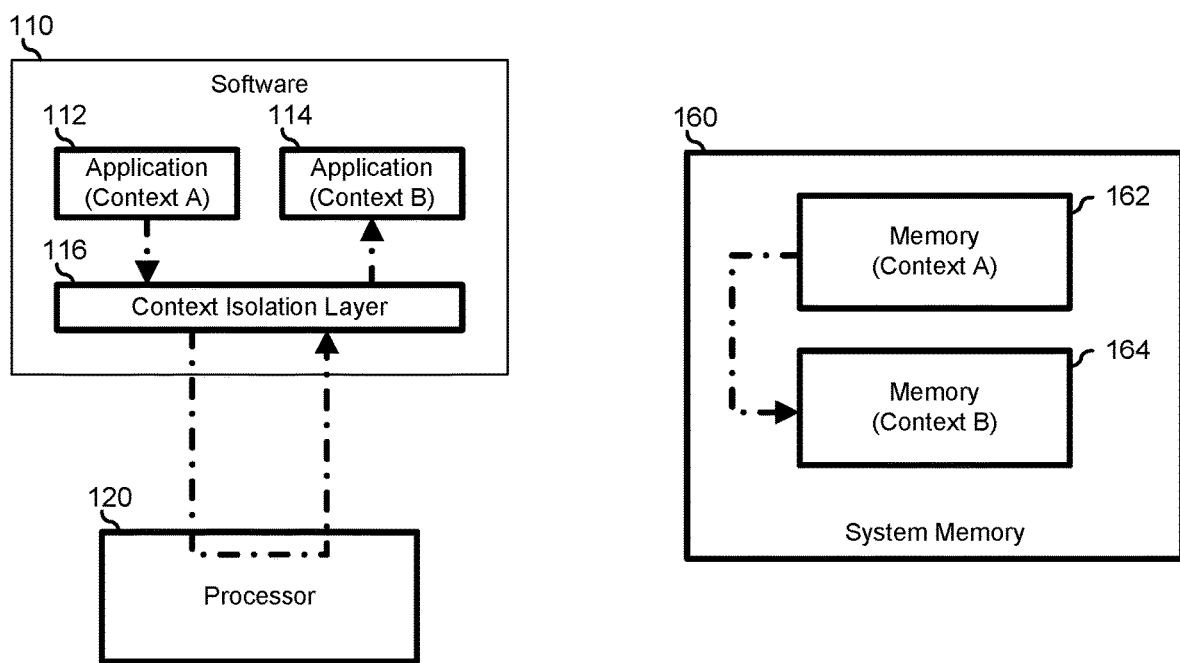
FIG. 1 is a block diagram of an information handling system according to the prior art.

FIG. 1 illustrates an information handling system 100 that utilizes a data exchange architecture in accordance with the prior art. Information handling system 100 includes software 110, a processor 120, and a system memory 160. Software 110 represents machine-executable code stored on information handling system 100 that is executable by processor 120, and includes a first application 112 that is associated with a first context, a second application 114 that is associated with a second context, and a context isolation layer 116. Application 112 is associated with one or more address ranges in the system physical address space (SPA) provided by system memory 160. The address ranges associated with application 112 are collectively shown as a portion 162 of system memory 160. Similarly, application 114 is associated with one or more address ranges in system memory 160, collectively shown as a portion 164 of the system memory. Context isolation layer 116 represents one or more agent, application program interface (API), utility, or the like that operates to maintain the segregation between memory 162 and 164. Examples of context isolation layer 116 may include a system Basic Input/Output System (BIOS) or Universal Extensible Firmware Interface (UEFI), hereinafter referred to collectively as "BIOS," that operates to provide isolated memory ranges for system operations, a virtual desktop system that segregates various memory ranges for the use of multiple users of the virtual desktop system, a hypervisor or virtual machine manager (VMM) that sets up and maintains virtual machines and their associated memory ranges, or the like.

In operation, when applications 112 and 114 are instantiated on information handling system 100, context isolation layer 116 allocates memory 162 and 164 to the use of their respective applications. In addition, when applications 112 and 114 need to interact, for example by moving data from one application to the other, context isolation layer 116 operates to manage the transfer of data between memory 162 and 164.

Note here that the data exchange architecture of information handling system 100 requires the execution of code associated with context isolation layer 116 by processor 120 in order to perform data transfers between memory 162 and memory 164. As such, the prior art data exchange architecture imposes a processing burden on processor 120, thereby reducing the processor cycles available for performing other tasks associated with applications 112 and 114. It will be understood that this processing overhead may be partially mitigated by the inclusion of Direct Memory Access (DMA) hardware in information handling system 100. However, it will be further understood that such DMA hardware is typically a vendor specific add-on, and access to such DMA hardware by applications 112 and 114 directly is typically difficult. In particular, even with the inclusion of DMA hardware, processor 120 is still needed to set up DMA transfers, and context isolation layer 116 is still needed in its role as gatekeeper to system memory 160.

Figure 2:
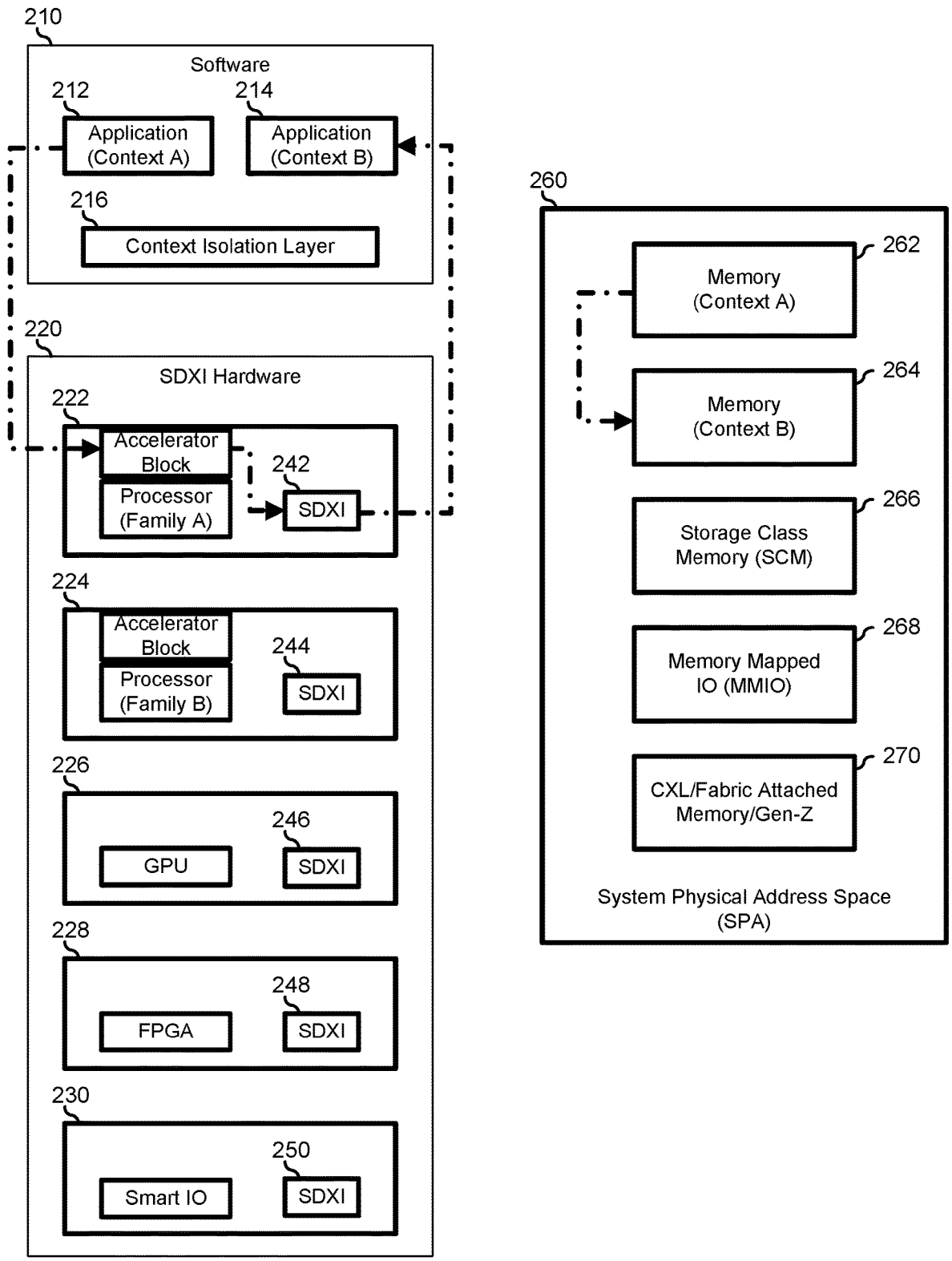
FIG. 2 is a block diagram of an information handling system according to an embodiment of the current disclosure.

FIG. 2 illustrates an information handling system 200 that utilizes a Smart Data Accelerator Interface (SDXI) data exchange architecture in accordance with an embodiment of the current disclosure. Information handling system 200 includes software 210, SDXI hardware 220, and a system physical address space (SPA) 260. SDXI hardware 220 includes a first family of processors 222 and an associated SDXI interface 242, a second family of processors 224 and an associated SDXI interface 244, one or more Graphics Processor Unit (GPU) 226 and an associated SDXI interface 246, a Field-Programmable Gate Array (FPGA) 248 and an associated SDXI interface 248, and a Smart I/O device 230 and an associated SDXI interface 250. Software 210 is similar to software 110, and represents machine-executable code stored on information handling system 200 that is executable by a processor such as one or more of processors 222 and 224. Software 210 includes a first application 212 that is associated with a first context, a second application 214 that is associated with a second context, and a context isolation layer 216. Software 210 may include functions and features similar to software 110, as described above. In particular, software 210 may implement the data exchange architecture of information handling system 100, as needed or desired. As such, application 212 is associated with one or more address ranges in SPA 260, with the associated address ranges shown as a portion 262 of the SPA, and application 214 is associated with one or more address ranges in the SPA, with the associated address ranges shown as a portion 264 in the SPA. Here too, context isolation layer 216 is similar to context isolation layer 116, representing one or more agent, API, utility, or the like that operates to maintain the segregation between memory 262 and 264. As such, context isolation layer 216 operates to allocate memory 262 and memory 264 when respective application 212 and application 214 are instantiated on information handling system 200, and the context isolation layer prevents the use of various memory ranges by unauthorized applications.

The SDXI data exchange architecture represents an industry effort to expand and standardize data movement protocols and hardware accelerator interfaces. As such, information handling system 200 broadens the scope of data exchanges on both the hardware side and the memory side. In particular, on the hardware side, SDXI hardware 220 incorporates various types of processing elements, co-processors, accelerators, and other data movers, as typified by processor families 222 and 224, GPU 226, FPGA 228, and Smart I/O device 230. On the memory side, SPA 260 is expanded to include not only the system physical memory, as typified by memory 262 and memory 264, but also separately attached memory, such as Storage Class Memory (SCM) devices 266, memory mapped I/O (MMIO) devices 268, and memory architectures, such as Compute Express Link (CXL) and Gen-Z memory interfaces, fabric-attached memory, and the like, as shown collectively as memory device 270. In particular, the SDXI data exchange architecture treats all of memory devices 262, 264, 266, 268, and 279 as a single SPA 260. The SDXI data exchange architecture then provides standardized interfaces for data movement between software 210, SDXI hardware 220, and SPA 260. Here, SDXI interfaces 242, 244, 246, 248, and 250 represent hardware and software associated with their respective hardware devices, such that a common set of SDXI commands, instructions, procedures, calls, and the like, referred to hereinafter as "SDXI commands," can be made to the hardware devices. Here, the details of implementing the various SDXI commands can be left to the design requirements and desires of the various hardware manufacturers. In this way, the SDXI data exchange architecture remains extensible and forward-compatible with new hardware or memory developments, and is independent of actual data movement details, data acceleration implementations, and the underlying I/O interconnect technology. The SDXI commands support: data movement between different address spaces including user address spaces located within different virtual machines; data movement without mediation by privileged software once a connection has been established; an interface and architecture that can be abstracted or virtualized by privileged software to allow greater compatibility of workloads or virtual machines across different servers; a well-defined capability to quiesce, suspend, and resume the architectural state of a per-address-space data mover to allow "live" workload or virtual machine migration between servers; mechanisms to enable forwards and backwards compatibility across future specification revisions, allowing software and hardware designed to different specification revisions to interoperate; the ability to incorporate additional offloads in the future leveraging the architectural interface; and a concurrent DMA model. As used herein, SDXI will be understood to represent any present or future specifications, specification revisions, articles, working papers, or other publications of the Smart Data Accelerator Interface (SDXI) Technical Working Group (TWG) of the Storage Networking Industry Association (SNIA).

Figure 3:
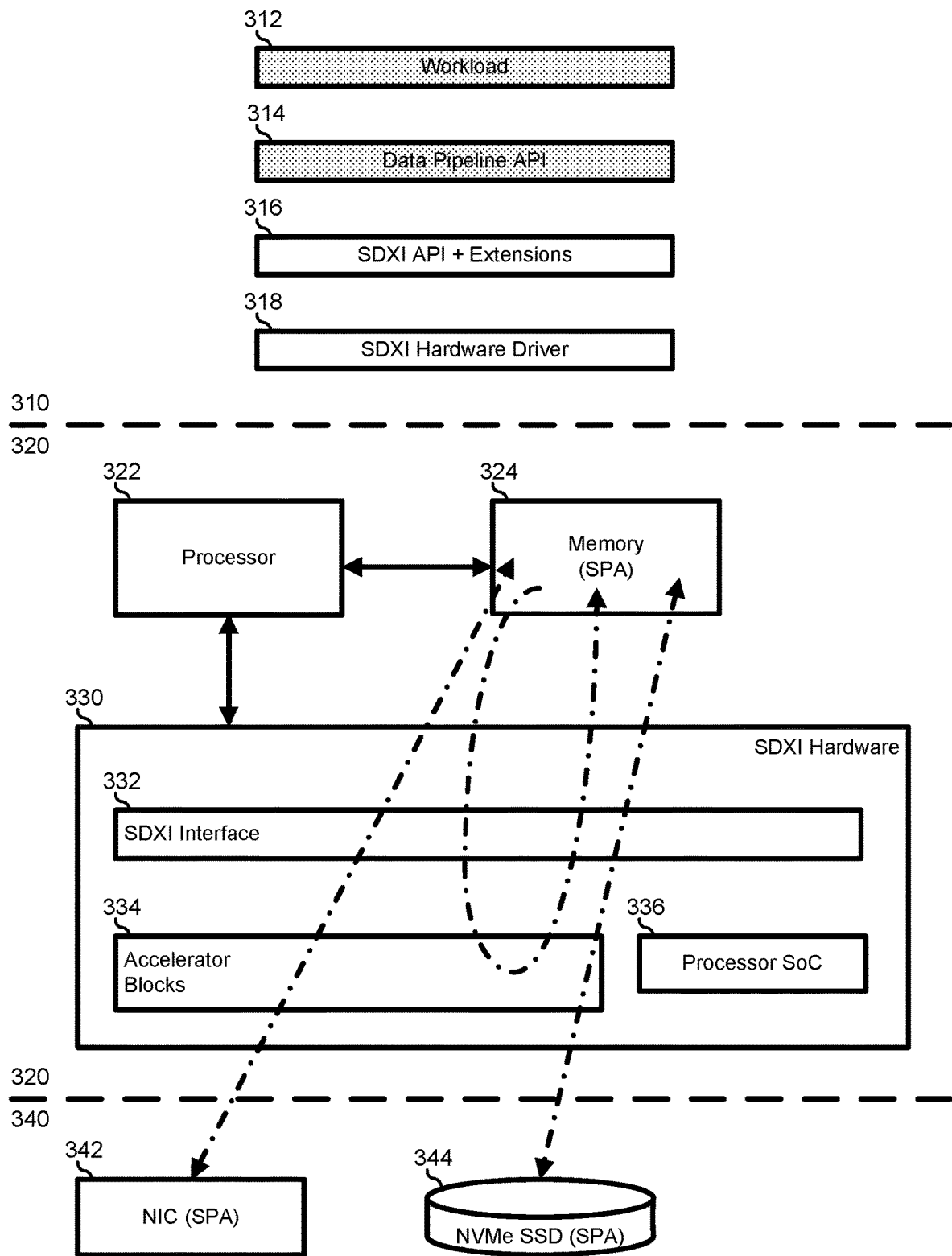
FIG. 3 is a block diagram of an information handling system according to another embodiment of the current disclosure.

FIG. 3 illustrates an embodiment of an information handling system 300 similar to information handling system 200. Information handling system 300 includes a software layer 310, a hardware layer 320, and an attachment layer 340. Software layer 310 is similar to software 210, and includes a workload 212, a data pipeline API 214, a SDXI API 216, and a SDXI hardware driver 218. Hardware layer 320 includes a processor 322, a memory (SPA) 324, and a SDXI hardware device 330. Attachment layer 340 includes a Network Interface Card (NIC) 342 and a Non-Volatile Memory-Express (NVMe) Solid State Drive (SSD) 344. NIC 342 and SSD 344 are each extensions of the SPA space of information handling system 300.

Workload 312 and data pipeline API 314 operate similarly to applications 212 and 214, and context isolation layer 216, and represent elements of a typical information handling system that perform the processing task of the information handling system. In particular, workload 312 operates to perform various operations on data and to move data between different storage and processing elements of information handling system 300, and may make various service calls to data pipeline API to assist in such processing operations and data moves. SDXI API 316 represents an API configured to provide the core operability as specified by a particular revision of an SDXI specification. In addition, SDXI API 316 provides additional extensions to the core operability of the particular SDXI specification, as described below. When workload 312 or data pipeline API 314 invoke SDXI API 316 for the various data operations or data moves, the SDXI API operates to direct SDXI hardware driver 318 elicit SDXI hardware 330 to perform one or more of the invoked operations or data moves, as needed or desired. In this regard, SDXI hardware driver 318 and SDXI hardware 330 are closely associated with each other.

As such, SDXI hardware 330 represents a wide variety of different types of hardware that can be utilized to perform the SDXI core operations and extensions as described herein. An example of SDXI hardware 330 may include accelerator blocks within a general purpose processor or processor family, such as a CPU or the like, a purpose specific processor, such as a GPU or the like, a logic-based device or state-based device, such as a FPGA, a Complex Programmable Logic Device (CPLD) or the like, a smart I/O device that provides in-line data processing in the course of I/O operations, such as a smart NIC, a Host Bus Adapter (HBA), a storage controller such as a RAID controller, a Network Attached Storage (NAS) device, a Storage Area Network (SAN) controller, or the like, or another processing device, as needed or desired. Here, it will be understood that, SDXI hardware 330 may be configured to provide operations consistent with its type, but that are not specifically associated with its SDXI functionality. For example, where SDXI hardware 330 represents a FPGA type of device, it will be understood that the FPGA device may be invoked to provide functionality of a more general nature, in addition to the SDXI functionality as described herein.

SDXI hardware 330 includes a SDXI interface 332, various accelerator blocks 334, and a processor SoC 336. Accelerator blocks 334 may represent hardware accelerators, logic-based or state-based accelerators, or other configurable or pre-configured accelerator functions, as needed or desired. As described further below, SDXI hardware 330 may operate in some embodiments to provide enhanced data pipelining operations. For example, SDXI hardware 330 may provide data movement: between different locations in memory 324, to and from the memory and a network connected to NIC 342, to and from the memory and NVMe SSD 344, to and from the network and the NVMe SSD, and between different locations in the NVME SSD. SDXI hardware 330 may further operate in some embodiments to provide enhanced data transformation operations on data, either as atomic operations or in conjunction with the data movement utilizing various accelerator blocks 334. In particular, various embodiments of SDXI hardware 330 may provide: data compression/decompression, data encryption/decryption, data checksums, hash functions such as SHA-256 hashes and the like, RAID functions, erasure coding, and the like. Other functions that may be performed by SDXI hardware 330 may include data deduplication, LZ-4 compression, compression ratio and block size optimization, data operation chaining, multi-point data movement, uncompressible block handling, and query analytics.

Figure 4:
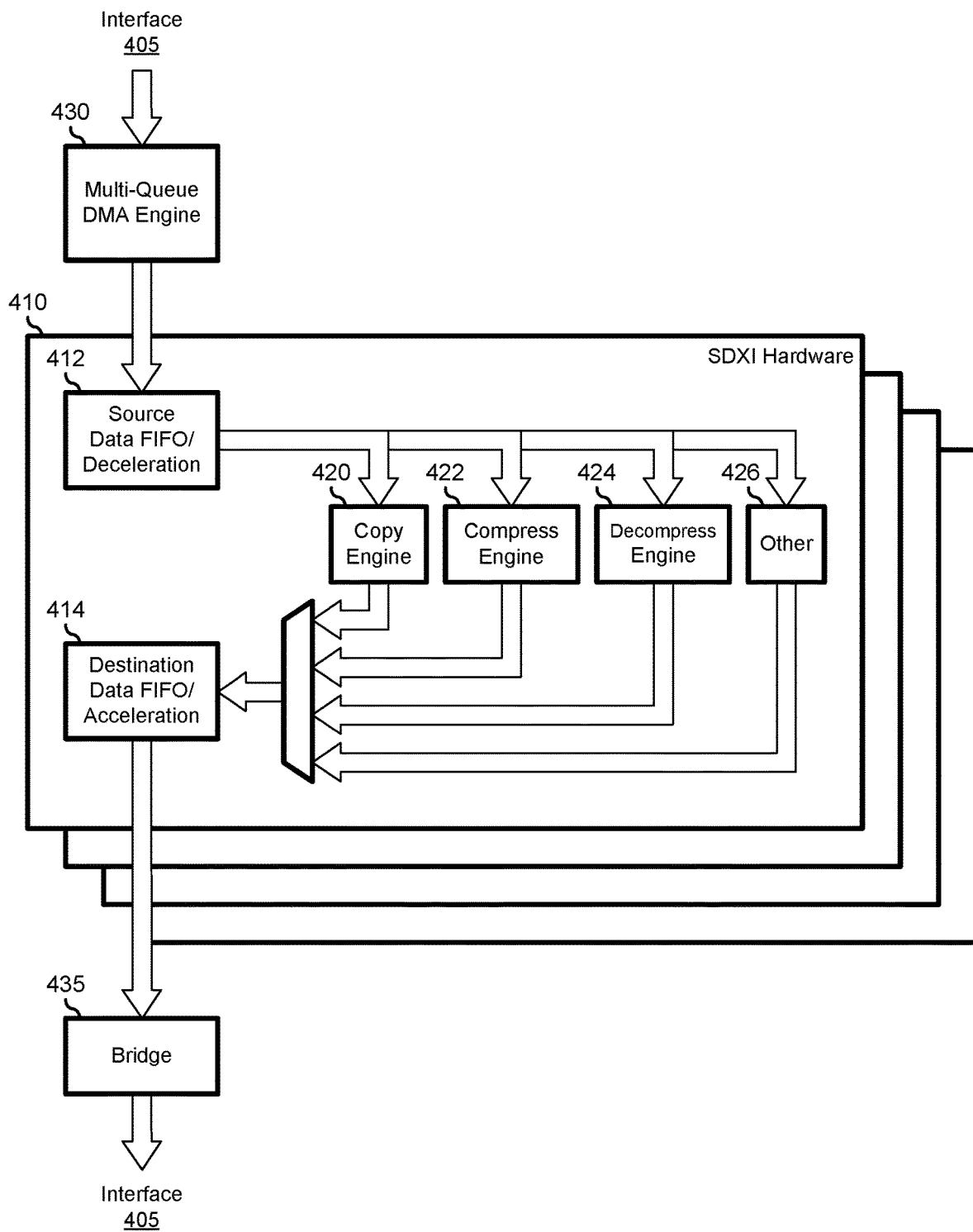
FIG. 4 is a block diagram of a portion of an information handling system according to another embodiment of the current disclosure.

FIG. 4 illustrates an embodiment of an information handling system 400 similar to information handling systems 200 and 300. Information handling system 400 includes a processor complex (not illustrated) that provides a communication interface 405 to provide data communications with multiple SDXI hardware devices 410. An example of interface 405 may include a Third Generation Peripheral Component Interconnect-Express (PCIe Gen3) x16 (16-lane) communication link, a PCIe Gen3 communication link with greater or fewer lanes (e.g., x4, x8, x32), or another communication interface, as needed or desired. Information handling system 400 further includes a multi-queue Direct Memory Access (DMA) engine 430, and a data bridge 435. Each of the SDXI hardware devices 410 are connected to receive data and instructions from DMA engine 430, and to provide data and control information to data bridge 435. DMA engine 430 provides dynamic allocation of parallel data flows to the multiple SDXI hardware devices 410, as needed by the processing tasks operating on information handling system 400. The data flows are provided to DMA engine 430 via interface 405, and may be received from memory or storage devices within the SPA of information handling system 400. Data bridge 435 receives the data flows from SDXI hardware devices 410 and communicates the data flows via interface 405 to the memory and storage devices within the SPA of information handling system 400.

Each of the SDXI hardware devices 410 may be understood to be similar hardware devices, such as where the SDXI hardware devices are each provided by a common manufacturer and are a common device type. Here, DMA engine 430 may allocate data flows to the various SDXI hardware devices 410 based upon factors unrelated to the particular device type of the SDXI hardware devices. For example, DMA engine 430 may allocate data flows based upon the resource loading or availability of each of the SDXI hardware devices, the power level or power state of each of the SDXI hardware devices, or other factors not directly related to the type of the SDXI hardware devices, as needed or desired. Further, each of SDXI hardware devices 410 may be understood to be different hardware devices, such as where the SDXI hardware devices are provided by different manufacturers and are different device types. Here, DMA engine 430 may allocate data flows to the various SDXI hardware devices 410 based upon the type of each of the SDXI hardware devices. For example, where a particular SDXI hardware device 410 represents a network device, DMA engine 430 may allocate network based data flows to that particular SDXI hardware device. On the other hand, where a different SDXI hardware device represents a storage controller, DMA engine 430 may allocate storage based data flows to the other SDXI hardware device.

SDXI hardware device 410 is illustrated as including a source data FIFO/deceleration module 412, a destination data FIFO/acceleration module 414, a copy engine 420, a compression engine 422, a decompression engine 424, and one or more additional engines 426. The configuration illustrated by SDXI hardware device 410 will be understood to be typical, and representative of a wide range of device configurations, as needed or desired. As such, the particular configuration illustrated by SDXI hardware device 410 should not be understood to be limiting on the type, nature, features, configuration, or functionality of SDXI hardware devices in general. Other functions that may be performed by SDXI hardware 410 may include data deduplication, LZ-4 compression, compression ratio and block size optimization, data operation chaining, multi-point data movement, uncompressible block handling, and query analytics.

Figure 5:
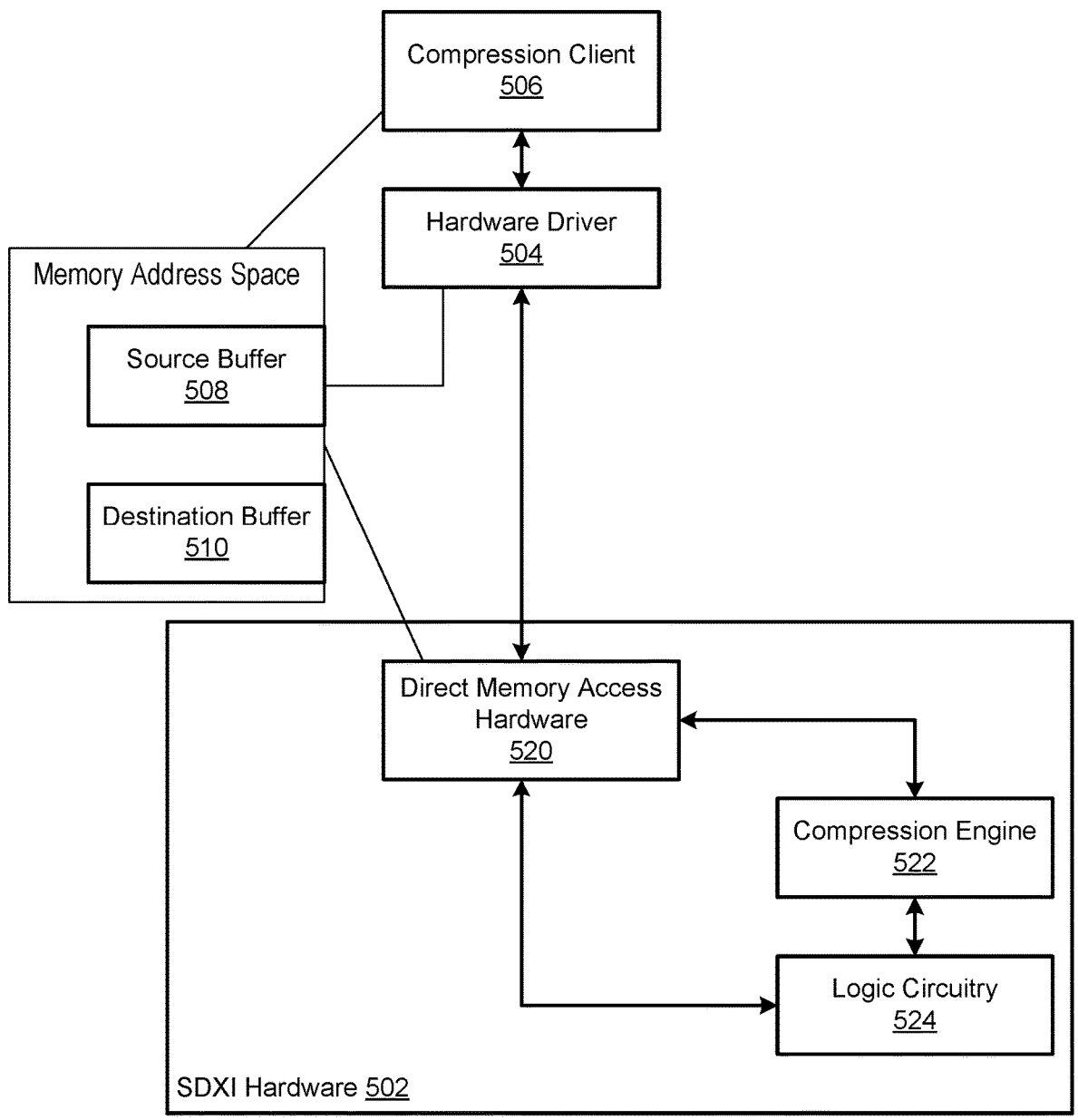
FIG. 5 is a block diagram of a portion of an information handling system according to another embodiment of the current disclosure.

FIG. 5 illustrates a portion of an information handling system 500 according to at least one embodiment of the current disclosure. Information handling system 500 may be any suitable information handling system including, but not limited to, information handling system 300, and information handling system 400. Information handling system 500 includes SDXI hardware 502, a hardware driver 504, a compression client 506, a source buffer 508, and a destination buffer 510. SDXI hardware 502 may execute one or more applications or include one or more components to perform the operations described herein. For example, SDXI hardware 502 includes direct memory access (DMA) hardware 520, a compression engine 522, and logic circuitry 524. In an example, SDXI hardware 502 may include one or more additional components without varying from the scope of this disclosure. In an example, SDXI hardware 502 may be any suitable hardware device including, but not limited to, SDXI hardware device 330 of FIG. 3. Hardware driver 504 may be any suitable type of driver including, but not limited to, SDXI hardware driver 318 of FIG. 3. For example, hardware driver 504 may include one or more additional hardware components including, but not limited to, an accelerator and a processor, such as accelerator blocks 334 and processor 336 of FIG. 3. While the description herein is described with respect to DMA hardware 520, compression engine 522, and logic circuitry 524, one or more of the operations may be performed by any suitable component of SDXI hardware 502 including, but not limited to, an accelerator and a processor, such as accelerator blocks 334 and processor 336 of FIG. 3. In certain examples, information handling system 500 may include additional components without varying from the scope of this disclosure.

During operation, compression client 506 may request a compression request for a block of data within source buffer 508. Based on the compression request, one or more operations may be performed to compress the data and store the compressed data in destination buffer 510. However, in certain examples, the data may not be easily compressed by compression engine 522, which in turn may result in a low compression ratio for the data. In an example, a compression ratio is size reduction amount for the data being compressed. The compression ratio may be a percent reduction from the original block size to the compressed block size. For example, if the original block size is 4 KB and the compressed block size is 2 KB, the compression ratio would be 50%. In certain examples, the compression ratio may be calculated in any other suitable way without varying from the scope of this disclosure. One of ordinary skill in the art would recognize that exemplary values provide herein are merely provided for explanation while any suitable value may be utilized without varying from the scope of this disclosure.

In an example, a user of information handling system 500 or a particular storage protocol within the information handling system may set a threshold compression ratio for determining whether the data is compressible. For example, information handling system 500 may implement a storage software pipeline to compress data, which in turn may have any suitable threshold compression ratio including, but not limited to, 40%, 50%, and 60%. One of ordinary skill in the art would recognize that the threshold compression ratio disclosed herein is merely an example and other thresholds may be utilized without varying from the scope of this disclosure.

In certain examples, particular blocks of data may not be easily compressible. In this situation, the compression ratio may be low. For example, if the original block size is 4 KB and the compressed block size is 3 KB, the compression ratio would be 25%. In this example, when data set or block of data is not compressible, such as a compression ratio below a threshold compression ratio, the value of compressing and decompressing the data may be low for drain and access of the data. Thus, information handling system 500 may be improved by keeping and storing the uncompressible data, data with low compression ratios, uncompressed. Therefore, based on whether data is compressible, information handling system 500 may be improved by the components of SDXI hardware 502 determining how to handle, such as store the data as either compressed or uncompressed, a compression request from compression client 506.

As stated above, compression client 506 may request a compression request for a block of data within source buffer 508. Based on the compression request, hardware driver 504 may issue a compression descriptor to SDXI hardware 502. In an example, the descriptor may include any suitable information for the data within source buffer 508 to be compressed. For example, the descriptor may include a descriptor type, such as data compression, an attribute of the data, such as uncompressed or compressed, a destination address key (akey), a source akey, a source address, a destination address, and a completion signal indicator. In an example, the destination and source akeys may specify a source buffer and a destination buffer for the data to be compressed. The source and destination addresses may specify particular addresses within the source buffer or the destination buffer.

In an example, hardware driver 504 may specify whether the address space is the same for both source buffer 508 and destination buffer 520. For example, hardware driver 504 may store the same akey value in both the destination akey field and the source akey field of the descriptor to specify the same address space for both source buffer 508 and destination buffer 520. Hardware driver 504 may store one akey value in the destination akey field and a different akey value in the source akey field of the descriptor to specify different address spaces for source buffer 508 and destination buffer 520.

After hardware driver 504 creates the descriptor, the hardware driver may notify SDXI hardware 502 that the compression request has been initiated by compression client 506. In an example, hardware driver 504 may provide the notification in any suitable manner including, but not limited to, sending a doorbell signal to one or more components of SDXI hardware 502, such as DMA hardware 520. In response to receiving the compression request notification, DMA hardware 520 may read the descriptor for the data block to be compressed. Based on the information in the descriptor, DMA hardware 520 may read the data from source buffer 508. For example, DMA hardware 520 may utilize the source akey and the source address to read the data from source buffer 508.

DMA hardware 520 may provide the data to compression engine 522, which in turn may attempt compression of the data. In an example, the attempt to compress the data may include, but is not limited to, compressing the data to determine a compression ratio for the data. In response to the data being compressed, the compressed data may be passed to logic circuitry 524. Logic circuitry 524 may perform one or more operations to determine whether the data is compressible or uncompressible. In addition, logic circuitry 524 may perform one or more operations to determine how to handle the data if the data is determined to be uncompressible. An exemplary, set of operations for logic circuitry 524 when the akey values indicate that the same address space is utilized for source buffer 508 and destination buffer 510 will be described with respect to FIG. 6.

Figure 6:
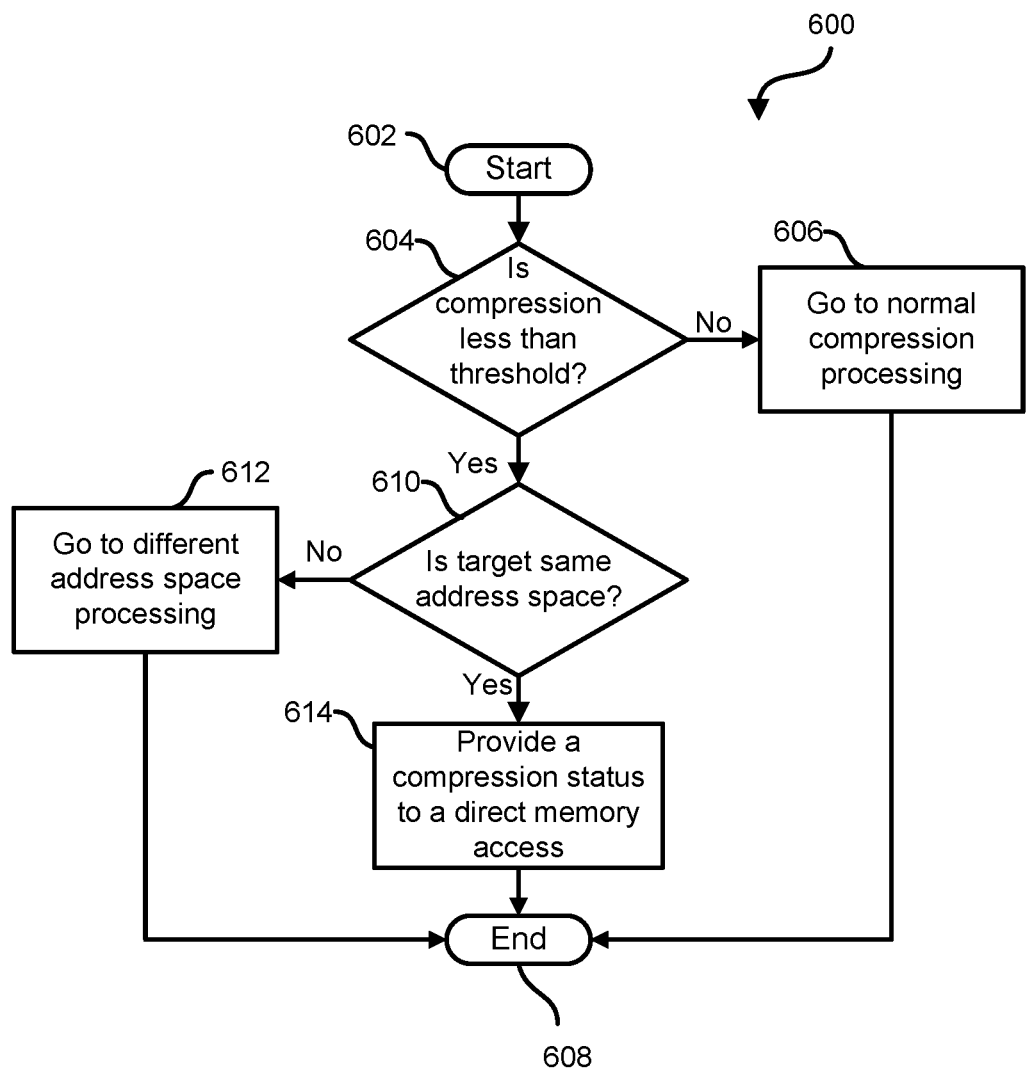
FIG. 6 is a flow diagram of a method for determining whether compression of data is below a threshold compression when a destination address space is the same as a source address space according to an embodiment of the current disclosure.

FIG. 6 is a flow diagram of method 600 for determining whether compression of data is below a threshold compression when a destination address is in the same address space as a source address according to an embodiment of the current disclosure, starting at block 602. Address "space" in this context means an area requiring one set of permissions or authentication for access. Different address spaces require different permissions. It will be readily appreciated that not every method step set forth in this flow diagram is always necessary, and that certain steps of the methods may be combined, performed simultaneously, in a different order, or perhaps omitted, without varying from the scope of the disclosure. FIG. 6 may be employed in whole, or in part, by information handling system 500 depicted in FIG. 5 or any other type of system, controller, device, module, processor, or any combination thereof, operable to employ all, or portions of, the method of FIG. 6.

At block 604, a determination is made whether the compression ratio for the data is less than the threshold compression ratio. In an example, the threshold compression ratio may be any suitable percentage including, but not limited to, a threshold compression ratio of 50%. In this example, compression ratio is defined as (original data block size—compressed data block size)/original data block size, such that the larger percentages mean more compression was achieved, and there is a threshold for what is deemed an acceptable level to warrant storage of the compressed data vs. storage of the original data. If the compression ratio is not less than the threshold compression ratio, the data is sent to normal compression processing at block 606, and the method ends at block 608. However, if the compression ratio is less than the threshold compression ratio, a determination is made whether the destination address space is the same as the source address space at block 610.

If the destination address space is not the same as the source address space, the data is sent to a different address space processing at block 612, and the method ends at block 608. If the destination address space is the same as the source address space, a compression status is provided to DMA hardware at block 614, and the method ends at block 608. In an example, the compression status may indicate that the data is uncompressible.

Referring back to FIG. 5, in response to the destination address space being the same as the source address space and the compression ratio for the data being less than the threshold compression ratio, logic circuitry 524 may pass the information for the data to DMA hardware 520. In an example, the information may include, but is not limited to, an indication that the data is incompressible. DMA hardware 520 may write a completion signal to the descriptor of for the data in source buffer 508. In an example, the completion signal may indicate that the compression request has been completed, and may also include metadata for the data. In an example, the metadata may indicate that the data is incompressible.

In an example, hardware driver 504 may process the metadata and determine that the block of data is incompressible. In response, if the source address space is the same for source buffer 508 and destination buffer 510, hardware driver 504 may flip source buffer and destination buffer for the block of data by populating a pointer to the destination buffer with the address of the source buffer. Hardware driver 504 may also return the uncompressed data to compression client 506.

In an example, if information in the descriptor, such as the source and destination akey (adress key) fields, may indicate different address spaces for source buffer 508 and destination buffer 510, logic circuitry 524 may perform one or more operations to determine how to handle the compressed data from compression engine 522. An exemplary, set of operations for logic circuitry 524 will be described with respect to FIG. 7.

Figure 7:
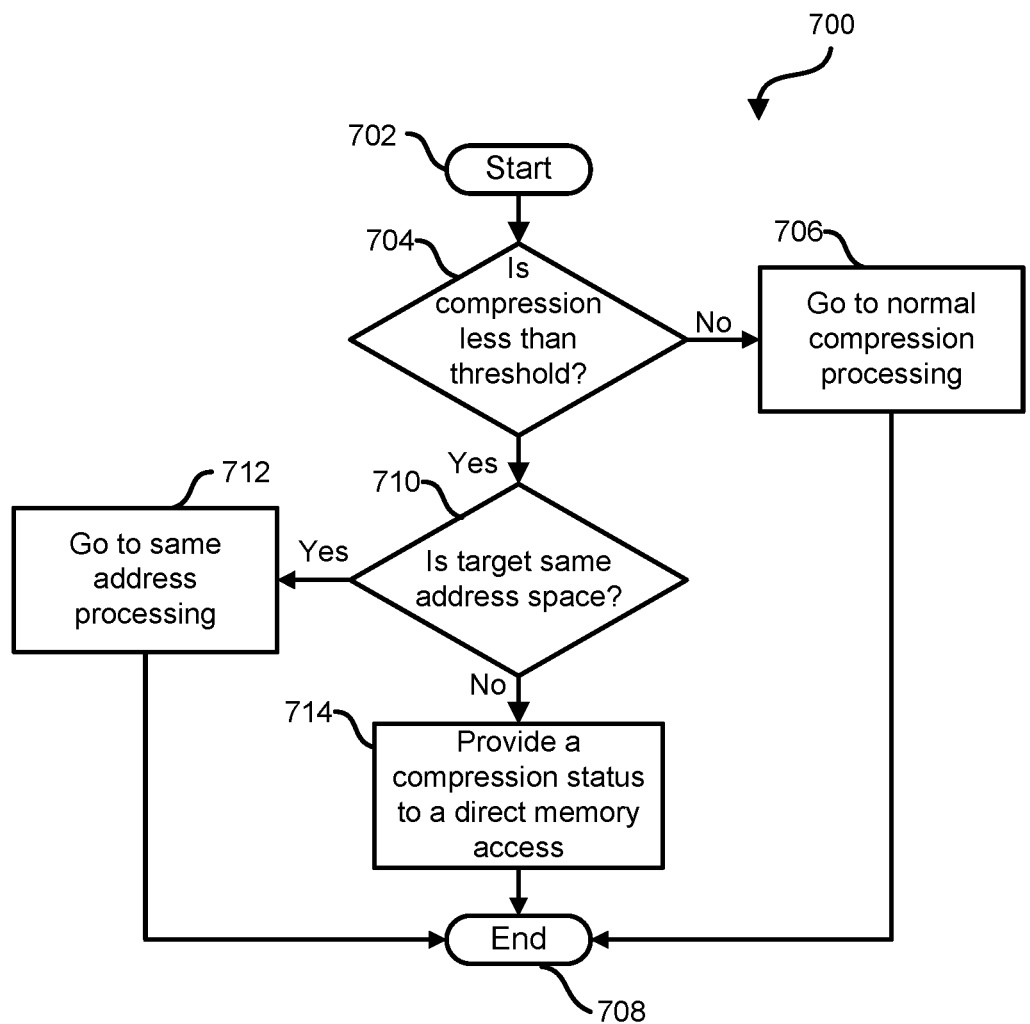
FIG. 7 is a flow diagram of a method for determining whether compression of data is below a threshold compression when a destination address space is different than a source address space according to an embodiment of the current disclosure.

FIG. 7 is a flow diagram of method 700 for determining whether compression of data is below a threshold compression when a destination address space is different than a source address space according to an embodiment of the current disclosure, starting at block 702. It will be readily appreciated that not every method step set forth in this flow diagram is always necessary, and that certain steps of the methods may be combined, performed simultaneously, in a different order, or perhaps omitted, without varying from the scope of the disclosure. FIG. 7 may be employed in whole, or in part, by information handling system 100 depicted in FIG. 5 or any other type of system, controller, device, module, processor, or any combination thereof, operable to employ all, or portions of, the method of FIG. 7.

At block 704, a determination is made whether the compression ratio for the data is less than the threshold compression ratio. If the compression ratio is not less than the threshold compression ratio, the data is sent to normal compression processing at block 706, and the method ends at block 708. However, if the compression ratio is less than the threshold compression ratio, a determination is made whether the destination address space is the same as the source address space at block 710.

If the destination address space is the same as the source address space, the data is sent to a same address space processing at block 712, and the method ends at block 708. If the destination address space is not the same as the source address space, a compression status is provided to DMA hardware at block 714, and the method ends at block 708. In an example, the compression status may indicate that the data is uncompressible.

Referring back to FIG. 5, in response to the destination address space being different than the source address space and the compression ratio for the data being less than the threshold compression ratio, logic circuitry 524 may pass the information for the data to DMA hardware 520. In an example, the information may include, but is not limited to, an indication that the data is incompressible. When the descriptor indicates the address space for source buffer 508 is different than the address space for destination buffer 510, DMA hardware 520 may write the uncompressed data to the destination address space as indicated by the descriptor. Further, DMA hardware 520 may write a completion signal to the descriptor of for the data in source buffer 508. In an example, the completion signal may indicate that the compression request has been completed, and may also include metadata for the data. In an example, the metadata may indicate that the data is incompressible.

In an example, hardware driver 504 may process the metadata and determine that the block of data is incompressible. Hardware driver 504 may also return the uncompressed data to compression client 506.

Figure 8:
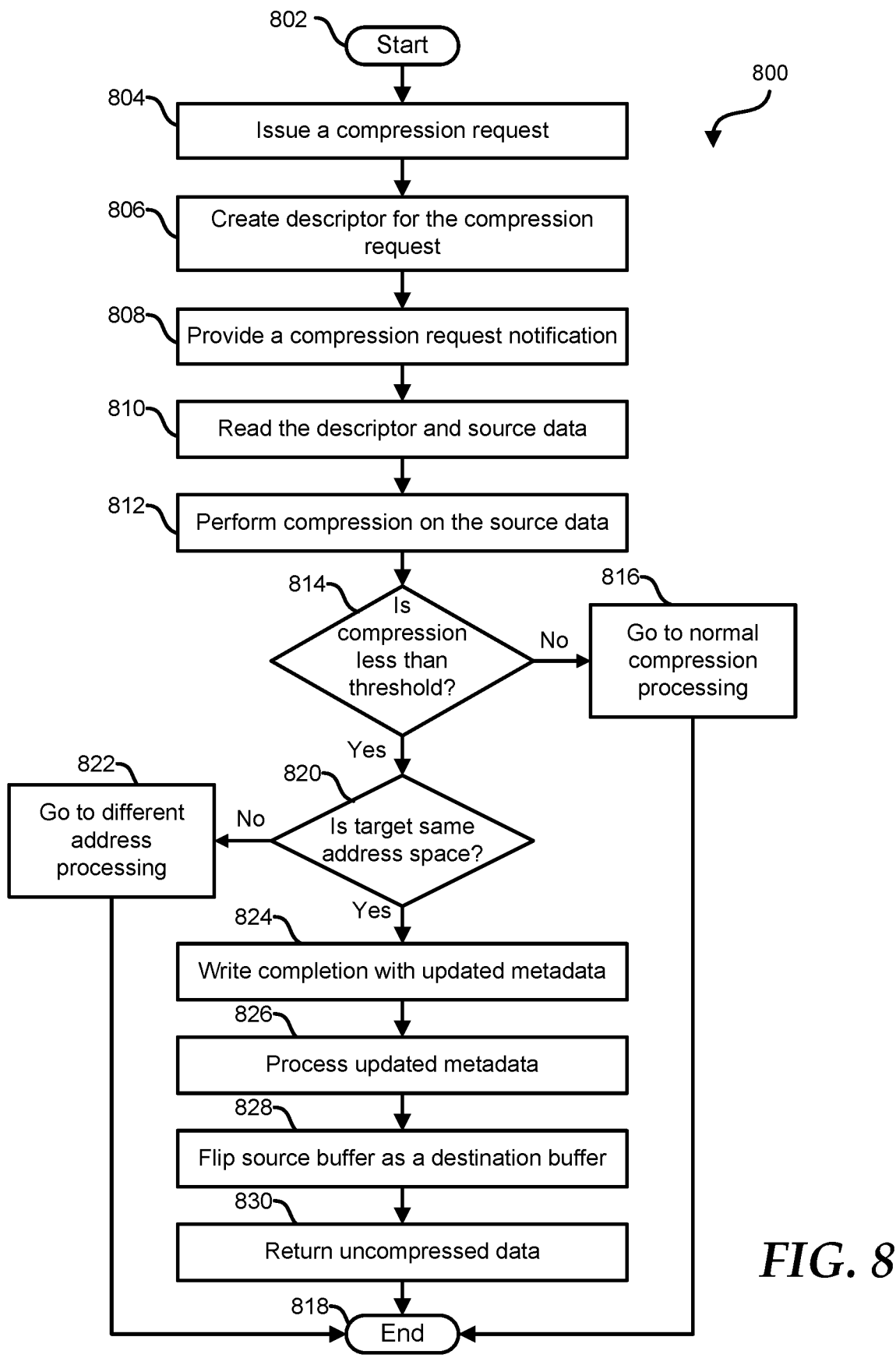
FIG. 8 is a flow diagram of a method for handling uncompressible data when a destination address space is the same as a source address space according to an embodiment of the current disclosure.

FIG. 8 is a flow diagram of a method for handling uncompressible data when a destination address space is the same as a source address space according to an embodiment of the current disclosure, starting at block 802. It will be readily appreciated that not every method step set forth in this flow diagram is always necessary, and that certain steps of the methods may be combined, performed simultaneously, in a different order, or perhaps omitted, without varying from the scope of the disclosure. FIG. 8 may be employed in whole, or in part, by information handling system 100 depicted in FIG. 5 or any other type of system, controller, device, module, processor, or any combination thereof, operable to employ all, or portions of, the method of FIG. 8.

At block 804, a compression request for a block of data is issued. In an example, the compression request may be issued by any suitable component within an information handling system including, but not limited to, a compression client, such as compression client 506 of FIG. 5. Based on the compression request, a descriptor for the block of data identified by the compression request is created at block 806. In an example, the descriptor may include any suitable information for the data to be compressed. For example, the descriptor may include a descriptor type, an attribute of the data, a destination akey, a source akey, a source address, a destination address, and a completion signal indicator. In an example, the destination and source akeys may specify a source buffer and a destination buffer for the data to be compressed. The source and destination addresses may specify particular addresses within the source buffer or the destination buffer. In an example, descriptor may specify whether the address space is the same for both the source buffer and the destination buffer. For example, the same akey value may be stored in both the destination akey field and the source akey field of the descriptor to specify the same address space for both the source buffer and the destination buffer.

At block 808, a compression request notification may be provided. In an example, the notification may be provided in any suitable manner including, but not limited to, sending a doorbell signal to one or more components of SDXI hardware, such as DMA hardware including within the SDXI hardware. At block 810, both the descriptor and the data block to be compressed may be read from the source buffer.

At block 812, the data may be compressed or attempted to be compressed. In an example, the attempt to compress the data may include, but is not limited to, compressing the data to determine a compression ratio for the data. At block 814, a determination is made whether the compression ratio for the data is less than the threshold compression ratio. In an example, the threshold compression ratio may be any suitable percentage including, but not limited to, a threshold compression ratio of 50%. If the compression ratio is not less than the threshold compression ratio, the data is sent to normal compression processing at block 816, and the method ends at block 818. However, if the compression ratio is less than the threshold compression ratio, a determination is made whether the destination address space is the same as the source address space at block 820.

If the destination address space is not the same as the source address space, the data is sent to a different address space processing at block 822, and the method ends at block 818. If the destination address space is the same as the source address space, a compression status with updated metadata is provided at block 824. In an example, metadata may indicate that the data is uncompressible. At block 826, the updated metadata is processed to determine that the block of data is incompressible. At block 828, the source buffer is flipped as the destination buffer for the block of data. At block 830, the uncompressed data is returned to a compression client, and the method ends at block 818.

Figure 9:
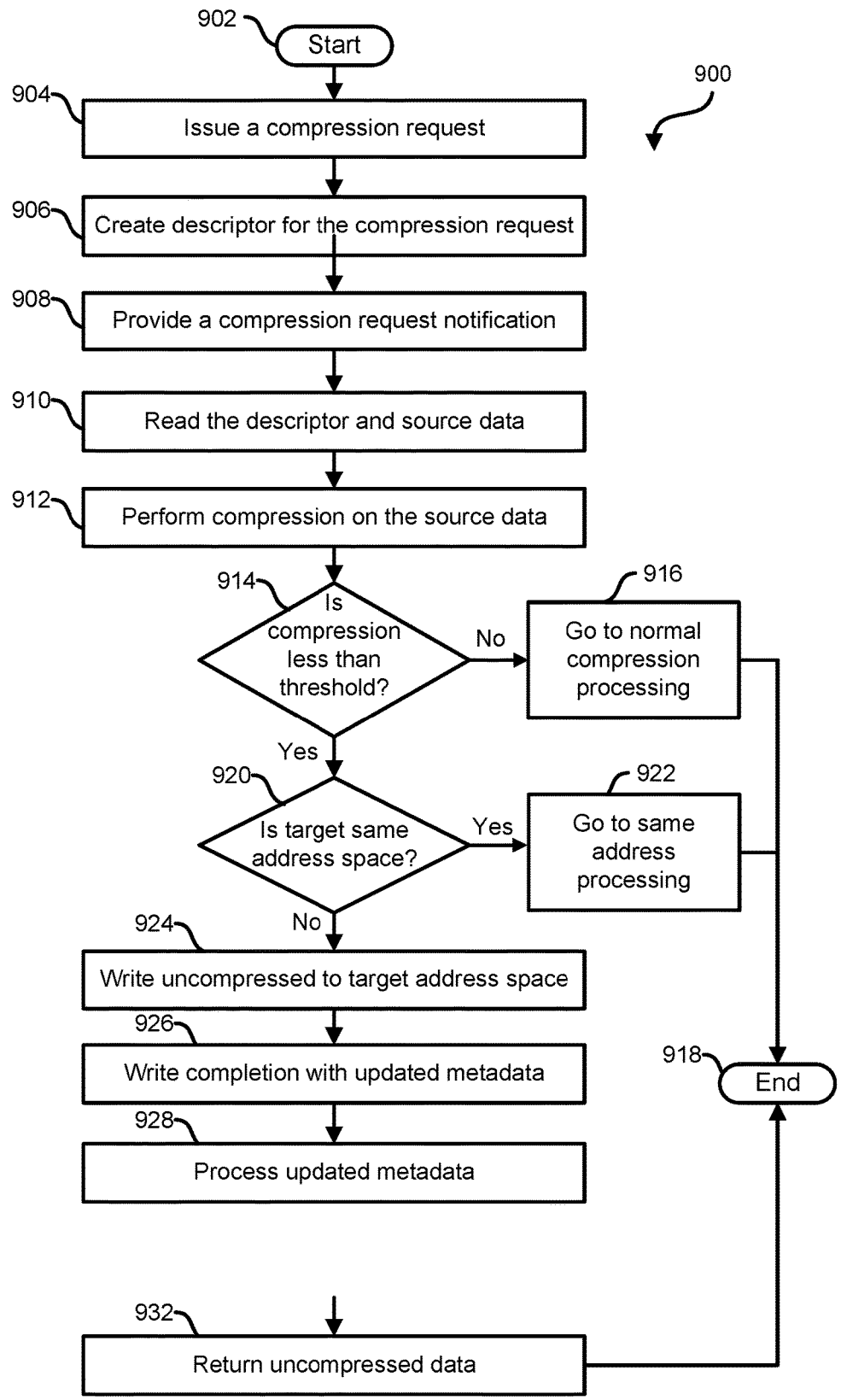
FIG. 9 is a flow diagram of a method for handling uncompressible data when a destination address space is different than a source address space according to an embodiment of the current disclosure.

FIG. 9 is a flow diagram of method for handling uncompressible data when a destination address space is different than a source address space according to an embodiment of the current disclosure, starting at block 902. It will be readily appreciated that not every method step set forth in this flow diagram is always necessary, and that certain steps of the methods may be combined, performed simultaneously, in a different order, or perhaps omitted, without varying from the scope of the disclosure. FIG. 9 may be employed in whole, or in part, by information handling system 100 depicted in FIG. 5 or any other type of system, controller, device, module, processor, or any combination thereof, operable to employ all, or portions of, the method of FIG. 5.

At block 904, a compression request for a block of data is issued. In an example, the compression request may be issued by any suitable component within an information handling system including, but not limited to, a compression client, such as compression client 506 of FIG. 5. Based on the compression request, a descriptor for the block of data identified by the compression request is created at block 906. In an example, the descriptor may include any suitable information for the data to be compressed. For example, the descriptor may include a descriptor type, an attribute of the data, a destination akey, a source akey, a source address, a destination address, and a completion signal indicator. In an example, the destination and source akeys may specify a source buffer and a destination buffer for the data to be compressed. The source and destination addresses may specify particular addresses within the source buffer or the destination buffer. In an example, descriptor may specify whether the address space is the same for both the source buffer and the destination buffer. For example, the different akey value may be stored in the destination akey field as compared to the source akey field of the descriptor to specify different address spaces for the source buffer and the destination buffer.

At block 908, a compression request notification may be provided. In an example, the notification may be provided in any suitable manner including, but not limited to, sending a doorbell signal to one or more components of SDXI hardware, such as DMA hardware including within the SDXI hardware. At block 910, both the descriptor and the data block to be compressed may be read from the source buffer.

At block 912, the data may be compressed or attempted to be compressed. In an example, the attempt to compress the data may include, but is not limited to, compressing the data to determine a compression ratio for the data. At block 914, a determination is made whether the compression ratio for the data is less than the threshold compression ratio. In an example, the threshold compression ratio may be any suitable percentage including, but not limited to, a compression ratio of 40%, 50%, and 60%. If the compression ratio is not less than the threshold compression ratio, the data is sent to normal compression processing at block 916, and the method ends at block 916. However, if the compression ratio is less than the threshold compression ratio, a determination is made whether the destination address space is the same as the source address space at block 920.

If the destination address space is the same as the source address space, the data is sent to a same address space processing at block 922, and the method ends at block 918. If the destination address space is not the same as the source address space, the uncompressed data is written to the destination address space at block 924. At block 926, a compression status with updated metadata is provided. In an example, metadata may indicate that the data is uncompressible. At block 928, the updated metadata is processed to determine that the block of data is incompressible. At block 930, the uncompressed data is returned to a compression client, and the method ends at block 918.

Figure 10:
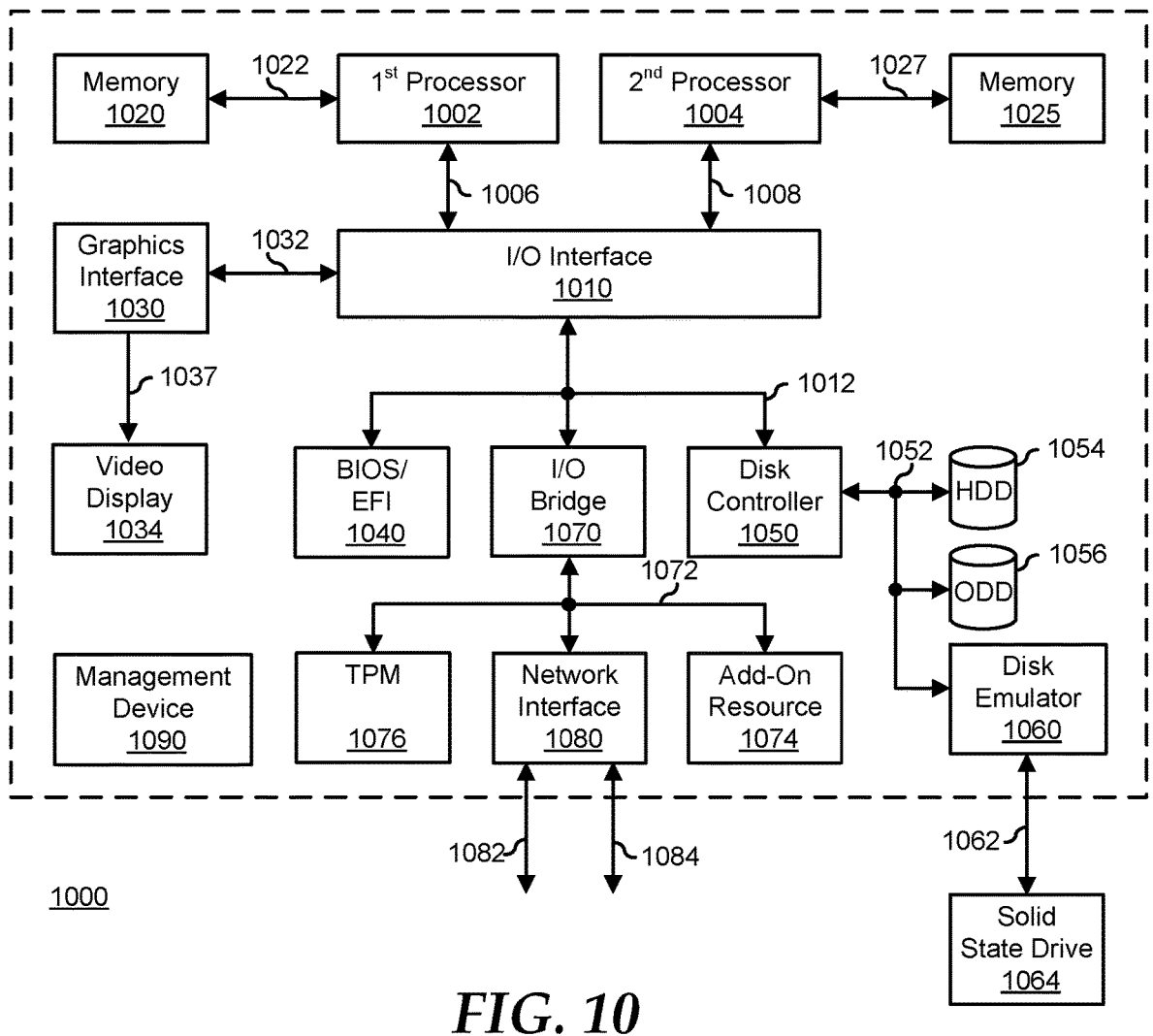
FIG. 10 is a block diagram illustrating a generalized information handling system according to another embodiment of the present disclosure.

FIG. 10 illustrates a generalized embodiment of an information handling system 1000. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1000 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 1000 can include processing resources for executing machine-executable code, such as a central processing unit (CPU), a programmable logic array (PLA), an embedded device such as a System-on-a-Chip (SoC), or other control logic hardware. Information handling system 1000 can also include one or more computer-readable medium for storing machine-executable code, such as software or data. Additional components of information handling system 1000 can include one or more storage devices that can store machine-executable code, one or more communications ports for communicating with external devices, and various input and output (I/O) devices, such as a keyboard, a mouse, and a video display. Information handling system 1000 can also include one or more buses operable to transmit information between the various hardware components.

Information handling system 1000 can include devices or modules that embody one or more of the devices or modules described below, and operates to perform one or more of the methods described below. Information handling system 1000 includes a processors 1002 and 1004, an input/output (I/O) interface 1010, memories 1020 and 1025, a graphics interface 1030, a basic input and output system/universal extensible firmware interface (BIOS/UEFI) module 1040, a disk controller 1050, a hard disk drive (HDD) 1054, an optical disk drive (ODD) 1056, a disk emulator 1060 connected to an external solid state drive (SSD) 1062, an I/O bridge 1070, one or more add-on resources 1074, a trusted platform module (TPM) 1076, a network interface 1080, a management device 1090, and a power supply 1095. Processors 1002 and 1004, I/O interface 1010, memory 1020, graphics interface 1030, BIOS/UEFI module 1040, disk controller 1050, HDD 1054, ODD 1056, disk emulator 1060, SSD 1062, I/O bridge 1070, add-on resources 1074, TPM 1076, and network interface 1080 operate together to provide a host environment of information handling system 1000 that operates to provide the data processing functionality of the information handling system. The host environment operates to execute machine-executable code, including platform BIOS/UEFI code, device firmware, operating system code, applications, programs, and the like, to perform the data processing tasks associated with information handling system 1000.

In the host environment, processor 1002 is connected to I/O interface 1010 via processor interface 1006, and processor 1004 is connected to the I/O interface via processor interface 1008. Memory 1020 is connected to processor 1002 via a memory interface 1022. Memory 1025 is connected to processor 1004 via a memory interface 1027. Graphics interface 1030 is connected to I/O interface 1010 via a graphics interface 1032, and provides a video display output 1036 to a video display 1034. In a particular embodiment, information handling system 1000 includes separate memories that are dedicated to each of processors 1002 and 1004 via separate memory interfaces. An example of memories 1020 and 1030 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 1040, disk controller 1050, and I/O bridge 1070 are connected to I/O interface 1010 via an I/O channel 1012. An example of I/O channel 1012 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 1010 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 1040 includes BIOS/UEFI code operable to detect resources within information handling system 1000, to provide drivers for the resources, initialize the resources, and access the resources. BIOS/UEFI module 1040 includes code that operates to detect resources within information handling system 1000, to provide drivers for the resources, to initialize the resources, and to access the resources.

Disk controller 1050 includes a disk interface 1052 that connects the disk controller to HDD 1054, to ODD 1056, and to disk emulator 1060. An example of disk interface 1052 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 1060 permits SSD 1064 to be connected to information handling system 1000 via an external interface 1062. An example of external interface 1062 includes a USB interface, an IEEE 1394 (Firewire) interface, a proprietary interface, or a combination thereof. Alternatively, solid-state drive 1064 can be disposed within information handling system 1000.

I/O bridge 1070 includes a peripheral interface 1072 that connects the I/O bridge to add-on resource 1074, to TPM 1076, and to network interface 1080. Peripheral interface 1072 can be the same type of interface as I/O channel 1012, or can be a different type of interface. As such, I/O bridge 1070 extends the capacity of I/O channel 1012 when peripheral interface 1072 and the I/O channel are of the same type, and the I/O bridge translates information from a format suitable to the I/O channel to a format suitable to the peripheral channel 1072 when they are of a different type. Add-on resource 1074 can include a data storage system, an additional graphics interface, a network interface card (NIC), a sound/video processing card, another add-on resource, or a combination thereof. Add-on resource 1074 can be on a main circuit board, on separate circuit board or add-in card disposed within information handling system 1000, a device that is external to the information handling system, or a combination thereof.

Network interface 1080 represents a NIC disposed within information handling system 1000, on a main circuit board of the information handling system, integrated onto another component such as I/O interface 1010, in another suitable location, or a combination thereof. Network interface device 1080 includes network channels 1082 and 1084 that provide interfaces to devices that are external to information handling system 1000. In a particular embodiment, network channels 1082 and 1084 are of a different type than peripheral channel 1072 and network interface 1080 translates information from a format suitable to the peripheral channel to a format suitable to external devices. An example of network channels 1082 and 1084 includes InfiniBand channels, Fibre Channel channels, Gigabit Ethernet channels, proprietary channel architectures, or a combination thereof. Network channels 1082 and 1084 can be connected to external network resources (not illustrated). The network resource can include another information handling system, a data storage system, another network, a grid management system, another suitable resource, or a combination thereof.

Management device 1090 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 1000. In particular, management device 1090 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 1000, such as system cooling fans and power supplies. Management device 1090 can include a network connection to an external management system, and the management device can communicate with the management system to report status information for information handling system 1000, to receive BIOS/UEFI or system firmware updates, or to perform other task for managing and controlling the operation of information handling system 1000. Management device 1090 can operate off of a separate power plane from the components of the host environment so that the management device receives power to manage information handling system 1000 when the information handling system is otherwise shut down. An example of management device 1090 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 1090 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a compression client to issue a compression request for a block of data, wherein the block of data is uncompressed;
   a memory having a plurality of storage locations identified by addresses, the addresses including a source address and a destination address; and
   a Smart Data Accelerator Interface (SDXI) hardware module to communicate with the compression client and with the memory, the SDXI hardware module to:
      read, via a direct memory access, a descriptor for the block of data to be compressed, wherein the descriptor for the block of data to be compressed is created by a driver;
      read, via the direct memory access, the block of data from the source address;
      perform compression of the block of data to create compressed data of the block of data;
      determine whether an amount of the compression of the block of data is less than a threshold amount of compression;
      in response to the amount of the compression being less than the threshold amount of compression:
         disregard the compressed data of the block of data; and
         utilize the block of uncompressed data in the source address; and
      update metadata for the block of data to indicate that data returned to client is uncompressed.

2. The information handling system of claim 1, wherein the SDXI hardware module further to:
   determine whether the destination address space is the same as the source address space; and
   if the destination address is in the same address space as the source address, flip a source buffer as a destination buffer without rewriting the block of data.

3. The information handling system of claim 2, wherein the SDXI hardware module further to:
write, via the direct memory access, a completion indication with the updated metadata indicating that the data is incompressible.

4. The information handling system of claim 3, wherein the driver further to:
process, by the driver, the updated metadata; and
return, by the driver, the uncompressed data to the compression client.

5. The information handling system of claim 2, wherein if the destination address is not in the same address space as the source address, the SDXI hardware module to write the block of data to the destination address as uncompressed data.

6. The information handling system of claim 5, wherein the SDXI hardware module further to:
write, via the direct memory access, a completion indication with the updated metadata indicating that the data is incompressible.

7. The information handling system of claim 6, further comprising:
process the updated metadata; and
return the uncompressed data to the compression client.

8. A method comprising:
issuing, by a compression client of an information handling system, a compression request for a block of data, wherein the block of data is uncompressed;
performing, by compression circuitry, a compression of the block of data to create compressed data of the block of data;
determining whether an amount of the compression of the block of data is less than a threshold amount of compression;
in response to the amount of the compression being less than the threshold amount of compression:
disregarding the compressed data of the block of data; and
utilizing the block of uncompressed data in a source address;
updating metadata for the block of data to indicate that data returned to compression client is uncompressed;
determining whether a destination address is in the same address space as the source address; and
if the destination address is in the same address space as the source address, flipping a source buffer as a destination buffer without rewriting the block of data.

9. The method of claim 8, wherein prior to the performing of the compression, the method further comprises:
creating, by a driver, a descriptor for the block of data to be compressed;
reading, via a direct memory access, the descriptor for the block of data to be compressed; and
reading, via the direct memory access, the block of data from a source address.

10. The method of claim 8, further comprising:
writing, via the direct memory access, a completion indication with the updated metadata indicating that the data is incompressible.

11. The method of claim 10, further comprising:
processing, by the driver, the updated metadata; and
returning, by the driver, the uncompressed data to the compression client.

12. The method of claim 8, further comprising:
if the destination address is not in the same address space as the source address, writing the block of data to the destination address as uncompressed data.

13. The method of claim 12, further comprising:
writing, via the direct memory access, a completion indication with the updated metadata indicating that the data is incompressible.

14. The method of claim 13, further comprising:
processing, by the driver, the updated metadata; and
returning, by the driver, the uncompressed data to the compression client.

15. A non-transitory computer-readable medium including code that when executed performs a method, the method comprising:
issuing a compression request for an uncompressed block of data;
compressing the block of data;
determining whether an amount of size reduction from the uncompressed block of data to the compressed block of data is less than a threshold amount;
if the amount of size reduction is less than the threshold amount, then disregarding the compressed block of data and utilizing the uncompressed block of data in a source address; and
updating metadata for the uncompressed block of data to indicate that data returned is uncompressed;
determining whether a destination address is in the same address space as the source address; and
if the destination address is in the same address space as the source address, flipping a source buffer as a destination buffer without rewriting the block of data.

16. The non-transitory computer-readable medium of claim 15, wherein prior to the performing of the compression, the method further comprises:
creating a descriptor for the block of data to be compressed;
reading the descriptor for the block of data to be compressed; and
reading the block of data from a source address.

17. The non-transitory computer-readable medium of claim 15, further comprising:
if the destination address is not in the same address space as the source address, writing the block of data to the destination address as uncompressed data.

* * * * *